Aug. 11, 1964   B. G. JESKE   3,143,770
MOLDING APPARATUS FOR SANDING PAD ASSEMBLY
Original Filed July 21, 1960   2 Sheets-Sheet 1
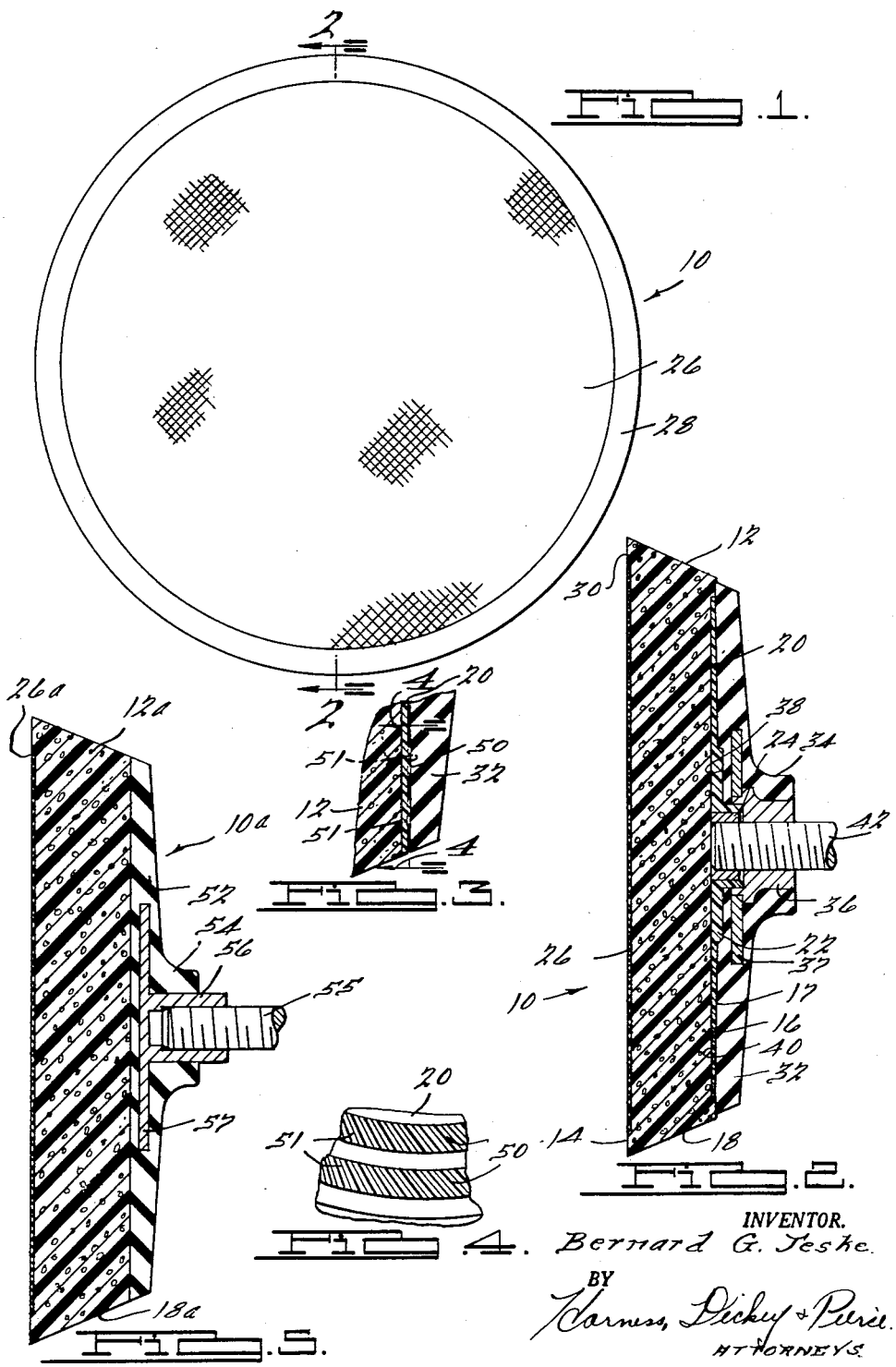
INVENTOR.
Bernard G. Jeske
BY
Harness, Dickey & Pierce
ATTORNEYS

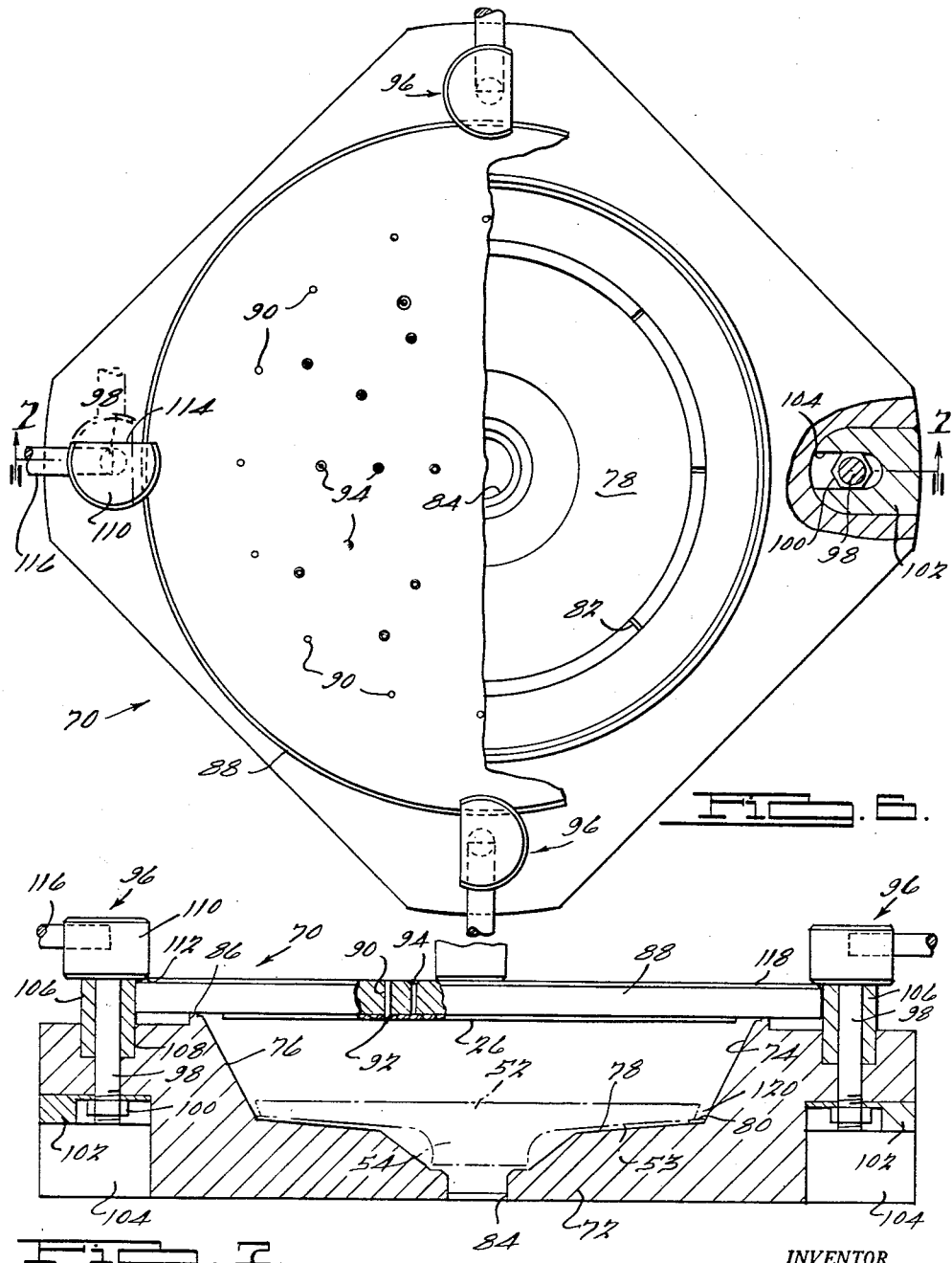

United States Patent Office 3,143,770
Patented Aug. 11, 1964

3,143,770
MOLDING APPARATUS FOR SANDING
PAD ASSEMBLY
Bernard G. Jeske, Dearborn, Mich., assignor to Formax
Manufacturing Corp., Detroit, Mich., a corporation of
Michigan
Original application July 21, 1960, Ser. No. 44,402, now
Patent No. 3,082,582, dated Mar. 26, 1963. Divided
and this application Dec. 5, 1962, Ser. No. 248,173
4 Claims. (Cl. 18—36)

This invention relates generally to an apparatus for manufacturing molded foam sanding pad assemblies.

This application is a divisional application of the co-pending application of Bernard G. Jeske, Serial No. 44,-402, filed July 21, 1960, now Patent No. 3,082,582, dated March 26, 1963.

Foam sanding pads are commonly used with a rotatable backing member in the sanding of irregularly curved surfaces such as automobile bodies. The pad is readily conformed to an irregular surface by virtue of its resilient foam construction and water is often used as a lubricant for the sanding paper which is secured to the working face of the pad either by friction or a suitable adhesive and as a coolant for the article being sanded. Prior pads of this type have consisted of a piece of foam cut to desired shape and secured by glue or the like to a backing member. The object of this invention is to provide a foam sanding pad which is molded to a desired shape and during molding is bonded on one side to a backing member and on the opposite side to a reinforcing member formed of canvas, leather, burlap, rubberized fabric, or the like. The molded pad is formed at its periphery with a continuous skin which is automatically formed during the molding operation and seals the pad against the entry of water or other lubricant as well as strengthening the pad against tearing, accidental or otherwise. In addition, the bonding of a foam pad to a circular backing member during molding of the pad makes it possible to attach the foam pad to both one face and the periphery of the backing member to thus provide a secure attachment of the pad to the backing member, with the edge of the backing member being foam-covered to prevent contact thereof with parts being sanded. The bonding of the reinforcing member to the pad during molding of the pad also provides for a secure attachment of the reinforcing member to the pad and if a porous reinforcing member is used, some foam can be allowed to pass through the reinforcing member to facilitate the frictional attachment of a disk of sanding paper to the face of the pad which carries the reinforcing member. By virtue of the fact that the reinforcing member is bonded to the pad during molding of the pad, the reinforcing member is embedded in the pad member and can thus be arranged so that the edges thereof are sealed in the surface of the pad and in addition, a foam lip is provided surrounding the reinforcing member to protect the workpiece being sanded. As a result of the construction of the assembly of this invention with the pad bonded to the backing member and the reinforcing member bonded to the pad, the usual steps of glueing these members together is eliminated.

Another object of this invention is to provide an improved apparatus for manufacturing a sanding pad assembly.

Further objects, features and advantages of this invention will become apparent from a consideration of the following description, the appended claims and the accompanying drawing in which:

FIGURE 1 is a plan view of the working face of the sanding pad assembly of this invention;

FIGURE 2 is a transverse sectional view of the sanding pad assembly of this invention, looking substantially along the line 2—2 in FIGURE 1;

FIGURE 3 is a fragmentary sectional view of another form of the pad assembly shown in FIGURE 2;

FIGURE 4 is a fragmentary sectional view looking substantially along the line 4—4 in FIGURE 3;

FIGURE 5 is a transverse sectional view, illustrated similarly to FIGURE 2, of a modified form of the sanding pad assembly of this invention;

FIGURE 6 is a plan view of a mold apparatus for manufacturing the sanding pad of this invention with some parts broken away for the purpose of clarity; and FIGURE 7 is a sectional view of the mold apparatus shown in FIGURE 6 looking substantially along the line 7—7 in FIGURE 6.

With reference to the drawing, the sanding pad assembly of this invention, indicated generally at 10, is illustrated in FIGURES 1 and 2 as including a foam pad member 12 which is molded to a circular disk-like shape having a flat working face 14, a substantially parallel rear face 16 and a peripheral edge surface 18 which extends between the faces 14 and 16 and is of a decreasing diameter in a direction toward the face 16. The pad member 12 is preferably formed of a polyurethane or equivalent foam material which is of cell structure internally and has the portions thereof which contact the mold, such as the edge surface 18, of an uninterrupted skin-like form so as to seal the outer surface of the pad 12 against the entry of water and similar materials. A backing member 20, which may be formed of a rigid rubber, plastic, or equivalent material is embedded in the rear face 16 of the pad member 12 during molding of the pad member 12 to the shape shown in FIGURE 2. The backing member 20 is also of circular, disk-like shape and may be of any desired thickness necessary for imparting the strength and/or flexibility required in the assembly 10. As shown in FIGURE 2, the backing member 20 is of a diameter less than the diameter of the pad member 12 at the face 16 and has a center hub section 22 which is of an increased thickness and is secured to an internally threaded tubular member 24. The backing member 20 is preferably molded to the shape shown in FIGURE 2 and during molding is bonded to the tubular member 24.

A reinforcing member 26, preferably formed of a heavy material such as canvas, leather, burlap, rubberized fabric or the like, and illustrated as canvas, is embedded in the working face 14 of the pad member 12 during molding of the pad 12. The reinforcing member 26 is shown in FIGURES 1 and 2 as being of a circular, disk-like shape of a diameter less than the diameter of the pad member 12 at the working face 14. With the reinforcing member 26 disposed in this position, an annular portion 28 of the pad member 12 surrounds the edge 30 of the reinforcing member 26 so as to prevent the edge 30 from damaging the workpiece during use of the assembly 10. However, it is to be understood that in instances in which a disk of sand paper of a diameter equal or greater than the diameter of the face 14 is to be used it is desirable to extend the reinforcing member 26 so that it is coextensive with the working face 14 of the pad member 12.

In use, the pad assembly 10 is initially assembled with an auxiliary backing member 32, formed of a firm rubber or equivalent material which is of a disk-shape and is of a diameter slightly less than the diameter of the rear face 16 of the pad 12. The auxiliary backing member 32 has a central tubular hub portion 34 which surrounds and is secured to an internally threaded tubular member 36 which is attached to a metal reinforcing disk 37 embedded centrally in the backing member 32 for strength purposes. The backing member 32 is also formed on the side thereof opposite the hub 34 with a central cavity 38 of a size to receive the hub portion 22 of the backing member 20. The backing member 20 is moved against the face 40 of the auxiliary backing member 32 so that the portion 22 is telescoped within the cavity 38, to automatically center the backing member 20 with the backing member 32 and the tubular member 24 is telescoped within the hub 34. The cavity 38 is somewhat deeper than the hub portion 22 to insure a tight engagement of the adjacent backing member faces 17 and 40. A threaded shaft 42 carried by a suitable driving tool (not shown) is then threaded into the tubular members 36 and 24. The shaft 42 is rotatable and when so mounted within the tubular members 24 and 36, functions to connect the backing members 20 and 32 so that the pad 12 is rotatable with the shaft 42. A disk of sanding paper of a size corresponding substantially to the size of the reinforcing member 26 is then held between the reinforcing member 26 and the workpiece surface to be sanded and is driven by the frictional force applied to the sanding paper by the reinforcing member 26. The sanding paper may also be secured to the member 26, if desired, by a suitable adhesive. To improve the frictional bond between the sanding paper and the reinforcing member 26 and to increase the working life of the member 26, some of the foam in the pad member 12 preferably extends through the pores in the fabric reinforcing member 26.

During use of the pad assembly 10 to sand an irregular surface such as an automobile body, the pad 12 yields so that it conforms to the contour of the body and the density of the pad member 12 can be controlled, by virtue of the fact that the pad 12 is molded, to provide the desired degree of yieldability. Water is often used as a lubricant for the sanding paper and a coolant for the workpiece and it is important that the amount of water entering the pad through the outer surfaces be kept to a minimum since it affects the balance and life of the pad member 12. The skin formed on the outer surface of the pad 12 prevents travel of objectionable amounts of fluid into and out of the pad and strengthens the pad against tearing. It also reduces the amount of water thrown as a result of the centrifugal force of the rotating pad.

To improve the attachment of the backing member 20 to the auxiliary backing member 32, the engaging faces 17 and 40 of the backing members 20 and 32 may be formed with alternating projections or ribs 50 and recesses 51, as shown in FIGURES 3 and 4, which are inclined relative to lines tangent to lines of circumference on the backing member faces. The projections 51 engage to facilitate the transfer of torque from the backing member 32 to the backing member 20.

In the modified form of the sanding pad 10a, illustrated in FIGURE 5, like numerals with the letter suffix "a" are used to indicate like parts in the assembly 10. The assembly 10a differs from the assembly 10 only in that a single backing member 52 is used in place of the two backing members 20 and 32 in the assembly 10. The single backing member 52 is of an increased thickness relative to the backing member 20 and is formed of a firm plastic or rubber material having a hub 54 which is generally tubular in shape and extends in a direction away from the pad member 12a. A tubular internally threaded member 56 attached to a central metal reinforcing disk 57 is mounted within and secured to the hub 54. A rotatable threaded shaft 55 on a suitable tool (not shown) is threaded into the tubular member 56.

The pad assembly 10a is used in the same manner that the pad assembly 10 is used and possesses all of the advantages of the assembly 10 except that it is uneconomical to merely discard the assembly 10a when the pad member 12a has become worn or damaged. The pad member 12a must be stripped from the backing member 52 which can then be re-bonded to a new molded pad member 12a during the molding thereof. In the assembly 10, the pad 12 with the backing member 20 bonded thereto can merely be discarded after it is no longer usable.

The apparatus for molding the pads 12 and 12a is indicated generally at 70 in FIGURES 6 and 7. The mold apparatus 70 consists of a base 72 formed with a mold cavity 74 having a tapered inclined side wall 76 and an inner or bottom wall 78. At its radially outer edge, the inner wall 78 is formed at the base with a raised sealing lip 80 which is annular and is provided with radially extending vent grooves 82. The center of the inner wall 78 communicates with an opening 84 in the bottom side of the base 72 which may be disposed any place radially inwardly of the lip 80 since its function is to vent the mold. At its top side, the base 72 is formed with an upwardly extending annular rim 86 which surrounds the upper end of the mold cavity 74 and constitutes an extension of the side wall 76. A circular top plate 88 of a size to be supported on the rim 88, is provided for closing the mold cavity 74. The top plate 88 carries a plurality of pins 90 which have their inner ends 92 projected into the cavity 74 when the top plate 88 is supported on the rim 86. The pins 90 are arranged in a circular formation on a radius of the top plate 88 which is less than the radius of a reinforcing member 26 for a purpose to appear presently. Radially inwardly of the pins 90, top plate 88 is provided with a plurality of vent apertures 94. Each one of the apertures 94 is located a distance from the center of the cover 88 different than the distance all of the other apertures are spaced from the center for a purpose also to be described presently. The apertures 94 are large enough to vent the mold cavity 74 and to provide uniform distribution of foam in the cavity.

Four clamping units 96 are mounted on the base 72 for releasably attaching the cover 88 to the base. Each unit includes an upwardly extending shank 98 carried by the base 72. A nut 100 is threaded onto the lower end of the shank 98 and is held against rotation by a slotted block 102 positioned in a cavity 104 in the underside of the base 72 and held in the cavity by the nut 100. A spacer sleeve 106 is positioned over the upper end of the shank 98 and forced downwardly into a cavity 108 in the top side of the base 72. A clamping head 110 of cylindrical shape with a flat side 114 is rigidly mounted on the upper end of the shank 98 so that the head 110 is eccentric with respect to the axis of the shank 98. The head 110 carries a handle 116 and has a beveled lower edge surface 112.

When the cover 88 is to be locked on the base 72, all of the heads 110 are moved to the position shown in broken lines for one of the heads in FIGURE 6 so that the flat sides 114 thereof are closest to the rim 86. With each of the heads 110 in this position, the cover 88 can be moved downwardly to a supported substantially centered position on the rim 86. The handles 116 on the heads 110 are then grasped to rotate the heads in a direction to move the heads over the top side of the cover 88 which is likewise provided with a beveled upper edge surface 118 to facilitate movement of the head 110 to a position over the cover 88. The beveled surface 112 on each head 110 engages the beveled surface 118 on the cover 88 and the head moves over the surface 118 and simultaneously forces the cover 88 downwardly into tight engagement with the rim 86 on the base 72. The heads 110 are rotated in a direction to move the shank 98 and the head 110 downwardly relative to the nut 100 which is held by the block 102, so that by manipulation of all of the heads 110, a uniformly tight engagement of all portions of the cover 88 with the rim 86 is insured.

In use, the mole apparatus 70 is pre-heated. The cover 88 is then removed and a backing member, such as the backing member 52 shown in broken lines in FIGURE 7, or a backing member 20 is positioned in the lower end of the mold cavity 74 so that the hub 54 on the backing member extends toward the base opening 84 and the radially outer portion of the back side 53 of the backing member 52 is supported on the seal lip 80. A predetermined quantity of a polyurethane or other foam material suitable in flexibility, density, external skin and other characteristics necessary to form a pad 12 having the above mentioned desired qualities is deposited in the mold cavity 74 on the top side of the backing member 52. The cover 88 with a reinforcing member 26 mounted on the pins 90 is then positioned on the lip 86 and the clamping devices 96 are manipulated to clamp the cover 88 onto the lip 86. The mold is then heated to satisfactorily complete the foaming of the reaction mass enclosed within the cavity 74.

The foaming of this material proceeds in the cavity 74 until it completely occupies the mold cavity 74, including the annular space 120 between the cavity wall 76 and the peripheral outer edge of the backing member 52. The provision of the vent slots 82 in the lip 80 insures a travel of the foaming material into the space 120. In addition, the apertures 94 in the cover 88 provides for a travel of some of the foam material through the pores or openings in the canvas reinforcing member 26 supported on the pins 90 so that the final pad 12 or 12a will be thoroughly impregnated with foam material and will have some of the foam material disposed on the working face of the canvas reinforcing member 26. The location of the apertures 94 precludes the formation of circumferentially aligned raised foam areas on the pad face which would produce a non-uniform cutting action of a sanding disk being rotated by the pad. The apertures 94 are sufficiently small to prevent the formation of raised foam areas which are objectionably large. The density and flexibility of the resulting foam material in the cavity 74 can be controlled in the practice of the invention by controlling the amount of the ingredients placed in the cavity.

By the simple expedient of varying the amount of raw material used in the molding process of this invention a flexibility as to the ultimate product is obtained which cannot be achieved by cutting slab stock to form the pad 12.

When the molding operation has been completed, the heads 110 are manipulated to release the cover 88 which is then removed from the base 72. The canvas reinforcing member 26 has been embedded in and firmly bonded to the foam pad so that when the cover is removed the pins 90 are merely withdrawn from the foam pad. The pad with the reinforcing member 26 and the backing member 52 firmly secured thereto can then be withdrawn from the mold cavity 74. All of the outer surfaces of the pad are formed with a continuous impervious skin which is very advantageous for the reasons previously mentioned. Immediately after the pad is withdrawn from the mold it is crushed to rupture the walls of the foam cells in accordance with normal procedure for obtaining an open cell foam structure.

In the event a thinner foam pad is desired, a support plate (not shown) of predetermined thickness is supported on the cavity bottom wall 78 so that the periphery of the plate engages the cavity side wall 76. The periphery of the support plate is notched to communicate the mold cavity with the vent slots 82, the pad backing member is supported on the support plate and the molding proceeds as above described.

In one embodiment of the invention, the pad member face is about 8 inches in diameter, the reinforcing member 26 is about 7½ inches in diameter, the rear face 16 is about 7 inches in diameter, and the pad is about 1¼ inches thick. Such a pad is formed in one embodiment of the invention as follows:

A prepolymer, consisting of a polyester or a polyether resin and a diisocyanate, which may be any one of several prepolymers readily available on the market at the present time, such as prepolymer F 202 R manufactured by the Nopco Chemical Company, of North Arlington, New Jersey, is mixed with a catalyst and deposited on the backing member in the mold cavity. The weight of the mixture determines the density of the resulting pad and a maxture of between about 50 and 150 grams may be used with satisfactory results. The catalyst is comprised in this embodiment of 0.3 part by weight of triethylamine, 1 part by weight of N-methymorpholine, 1.8 parts by weight of water, and 0.8 part by weight of a silicone emulsifier such as EF–4527 made by the Dow Corning Co. This catalyst is reacted in a mold pre-heated to approximately 130 °F. with 96.1 parts of the prepolymer. The mold is maintained at this temperature for approximately 10 minutes, following which the pad is removed and immediately crushed. The pad is then cured at 150° F. for about 3 hours.

It will be understood that the specific details of the improved sanding pad, the mold apparatus which is herein disclosed and described is presented for purposes of explanation and illustration and is not indended to indicate limits of the invention, the scope of which is defined by the following claims.

What is claimed is:

1. Molding apparatus comprising a base having a mold cavity in the top side thereof, said cavity having a side wall and a bottom wall which is formed at its radially outer extremity with a raised annular sealing lip having radially extending vent slots therein, passage means in said bottom wall including said vent slots for communicating said cavity with the atmosphere, a cover for said base adapted to be clamped to said top side thereof so as to close said mold cavity, said cover having vent openings therein, and a plurality of pins carried by said cover and projected inwardly into said cavity in a position of said cover supported on said base.

2. Molding apparatus for forming a product by molding a plastic material onto a backing member on one end and onto a reinforcing member on the opposite end, said apparatus comprising: a base having a mold cavity in the top thereof, said cavity having a side wall with a periphery larger than that of the backing member and a bottom wall which has formed at its radially outer extremity a raised, peripheral sealing lip, said sealing lip being of a size to engage and support the backing member away from the remainder of said bottom wall and having a plurality of radially extending vent slots therein, passage means in said bottom wall including said vent slots for communicating said cavity with the atmosphere, a cover for said base adapted to be clamped to said top thereof so as to close said mold cavity, said cover having vent openings therein communicating with the atmosphere, and a plurality of pins carried by said cover and projecting inwardly into said cavity when said cover is located over said cavity on said base with said pins holding said reinforcing member.

3. The apparatus of claim 2 in which said vent openings are located in line with the reinforcing member and with the reinforcing member being porous such that the plastic mold material will flow through the reinforcing member and onto its outer surface.

4. Molding apparatus for forming a product by molding a plastic material onto a backing member on one end, said apparatus comprising: a base having a mold cavity in the top thereof, said cavity having a side wall with a periphery larger than that of the backing member and a bottom wall which has formed at its radially outer extremity a raised, peripheral sealing lip, said sealing lip being of a size to engage and support the backing member away from the remainder of said bottom wall and having a plurality of radially extending vent slots therein, passage means in said bottom wall including said vent slots for communicating said cavity with the atmosphere, a cover for said base adapted to be clamped to said top thereof so as to close said mold cavity, said cover having vent openings therein communicating with the atmosphere.

References Cited in the file of this patent

UNITED STATES PATENTS

| | | |
|---|---|---|
| 2,133,810 | Craigue | Oct. 18, 1938 |
| 2,351,454 | Pereles | June 13, 1944 |
| 2,713,699 | Pooley | July 26, 1955 |
| 2,923,035 | Schwartz | Feb. 2, 1960 |
| 2,950,505 | Frank | Aug. 30, 1960 |
| 3,058,162 | Grabowski | Oct. 16, 1962 |